United States Patent
Farlow et al.

(10) Patent No.: US 9,732,856 B2
(45) Date of Patent: Aug. 15, 2017

(54) NON-REMOVABLE DISCHARGE DEVICE

(71) Applicant: DENSO International America, Inc., Southfield, MI (US)

(72) Inventors: Parker Farlow, Warren, MI (US);
Hugo Martinez, Birmingham, MI (US);
Daniel Tylutki, Livonia, MI (US);
Peter Mickley, Farmington Hills, MI (US); Sara Seres, Waterford, MI (US)

(73) Assignee: DENSO International America, Inc., Southfield, MI (US)

( * ) Notice: Subject to any disclaimer, the term of this patent is extended or adjusted under 35 U.S.C. 154(b) by 152 days.

(21) Appl. No.: 14/495,521

(22) Filed: Sep. 24, 2014

(65) Prior Publication Data
US 2016/0084386 A1    Mar. 24, 2016

(51) Int. Cl.
*F16K 1/04*  (2006.01)
*F16K 31/50* (2006.01)
*F16K 3/24*  (2006.01)

(52) U.S. Cl.
CPC ............... *F16K 1/04* (2013.01); *F16K 3/246* (2013.01); *F16K 31/50* (2013.01)

(58) Field of Classification Search
CPC ..... F16K 3/0254; F16K 3/0218; F16K 31/508
USPC ....... 251/144, 264, 215, 216, 339, 273, 218, 251/145, 904
See application file for complete search history.

(56) References Cited

U.S. PATENT DOCUMENTS

| | | | | |
|---|---|---|---|---|
| 1,059,824 A | * | 4/1913 | Brannon et al. | F16K 35/10 137/382 |
| 1,235,418 A | * | 7/1917 | Beach | F16K 29/00 137/243.5 |
| 1,345,032 A | * | 6/1920 | Smith | F16K 51/00 251/144 |
| 3,433,456 A | * | 3/1969 | Mueller | B67D 3/043 251/339 |
| 3,744,558 A | | 7/1973 | Childress | |
| 3,811,650 A | | 5/1974 | Dehar | |
| 3,869,391 A | * | 3/1975 | Kramer | F15B 21/041 137/351 |
| 3,910,550 A | | 10/1975 | Nelson | |
| 4,193,575 A | | 3/1980 | Burgess | |
| 4,679,618 A | * | 7/1987 | Farkas | F01P 11/0276 165/71 |
| 4,958,802 A | * | 9/1990 | Underwood | F16K 5/0414 251/214 |
| 5,259,588 A | | 11/1993 | Crosby, Jr. et al. | |
| 5,722,451 A | | 3/1998 | Godeau et al. | |
| 6,062,540 A | * | 5/2000 | Hubler | F16K 1/04 251/216 |

* cited by examiner

*Primary Examiner* — Craig Schneider
*Assistant Examiner* — Andrew J Rost

(57) ABSTRACT

A manual valve includes a knob, a stem, a stopper, and a male thread. The stem is extended from the knob. The stopper is extended from the stem. The male thread is extended from the stopper. The stem is smaller than the stopper in outer diameter. The stem is configured to be installed with a clip, which is a separate component from the manual valve. The stopper is configured to make contact with the clip in the axial direction and to be regulated movement in the axial direction when an outer periphery of the stem is installed with the clip and circumferentially surrounded with the clip.

3 Claims, 6 Drawing Sheets

RADIAL

AXIAL
(THICKNESS)

CIRCUMFERENTIAL

US 9,732,856 B2

NON-REMOVABLE DISCHARGE DEVICE

TECHNICAL FIELD

The present disclosure relates to a manual valve. The present disclosure further relates to a discharge device including the manual valve.

BACKGROUND

Conventionally, a manual valve is installed to a discharge device for a tank of a fluidic device. A conventional manual valve may be installed to a tank by, for example, screwing into a discharge hole of a discharge device installed to a tank. In such a configuration, the manual valve may be unscrewed to drain fluid accumulated in the tank or to vent the tank to enable filling the tank. When the manual valve is unscrewed, the manual valve may be easily detached from the tank. Consequently, it is concerned that the detached manual valve may be lost.

SUMMARY

The present disclosure addresses the above-described concerns.

According to an aspect of the preset disclosure, a manual valve comprises a knob. The manual valve further comprises a stem extended from the knob. The manual valve further comprises a stopper extended from the stem. The manual valve further comprises a male thread extended from the stopper. The stem is smaller than the stopper in an outer diameter. The stem is configured to be equipped with a clip, which is a separate component from the manual valve. The stopper is configured to make contact with the clip in an axial direction and to regulate movement of the stopper in the axial direction when an outer periphery of the stem is equipped with the clip and is circumferentially surrounded by the clip.

According to another aspect of the preset disclosure, a manual valve comprises a body. The manual valve further comprises a male thread extended from the body. The manual valve further comprises a stem extended from the male thread. The manual valve further comprises a stopper extended from the stem. The stem is smaller than the stopper in an outer diameter. The body has at least one pin and at least one recess. The at least one pin is projected in a radial direction outward from an outer periphery of the body. The at least one recess is dented in the radial direction inward from the outer periphery of the body. the pin is cantilevered at one end and is configured to be resiliently retracted into the recess.

According to another aspect of the preset disclosure, a manual valve comprises a knob. The manual valve further comprises a male thread extended from the knob. The manual valve further comprises a stem extended from the male thread. The male thread has at least one pin and at least one recess. The at least one pin is projected in a radial direction outward from an outer periphery of the male thread. The at least one recess is dented in the radial direction inward from the outer periphery of the male thread. The pin is cantilevered at one end and is configured to be resiliently retracted into the recess.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

In the following description, a radial direction is along an arrow represented by "RADIAL" in drawing(s). An axial direction is along an arrow represented by "AXIAL" in drawing(s). A thickness direction is along an arrow represented by "THICKNESS" in drawing(s). A lateral direction is along an arrow represented by "LATERAL" in drawing(s). A circumferential direction is along an arrow represented by "CIRCUMFERENTIAL" in drawing(s).

First Embodiment

Figure 1:
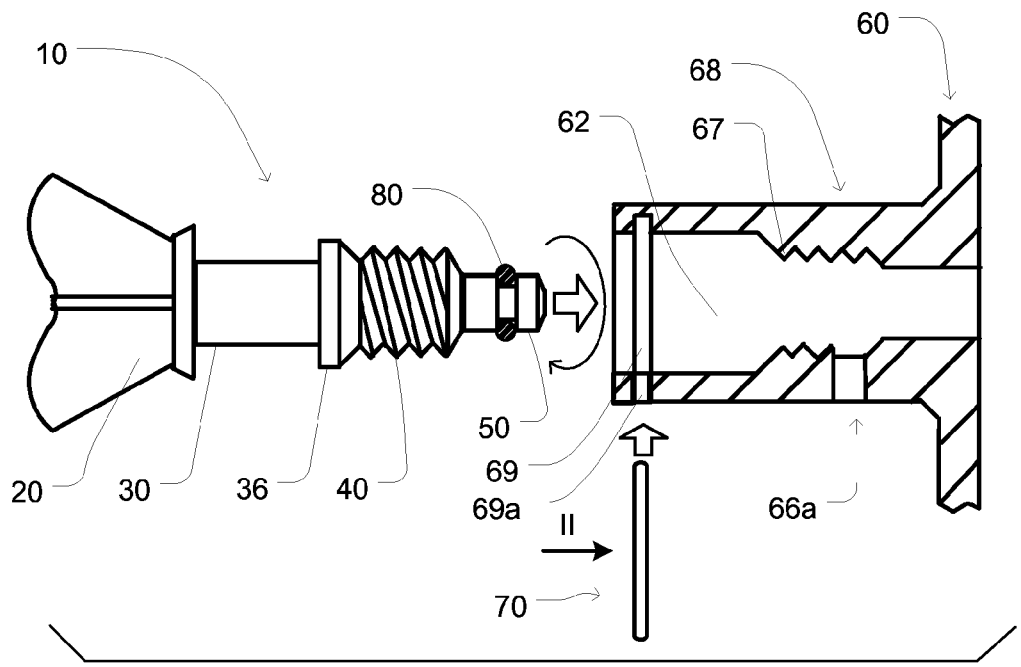
FIG. 1 is an exploded view showing a manual valve, a tank wall, and a clip of a discharge device according to a first embodiment.
Figure 1:
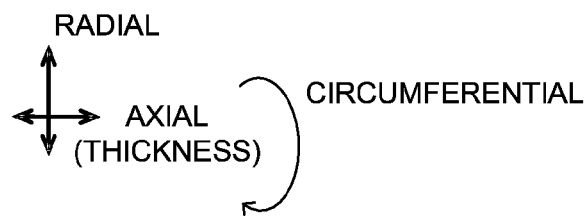

As follows, a first embodiment of the present disclosure will be described with reference to drawings. As shown in FIG. 1, a tank wall 60 is a part of a tank for receiving fluid. In the present example, the tank is a radiator tank for receiving cooling water. The tank is formed of, for example, a resin material.

The tank wall 60 has a discharge port 68, which is a tubular protrusion integrally formed with the tank wall 60 and projected from the tank wall 60. The discharge port 68 internally defines an insertion hole 62, a discharge hole 66*a*, a female thread 67, and a slot 69. The insertion hole 62 is a through hole interfacing an exterior of the tank with an interior of the tank. The female thread 67 is formed on the inner periphery of the discharge port 68 to define a part of the insertion hole 62. The discharge hole 66*a* is a through hole extending in the radial direction through the tubular wall of the discharge port 68 to interface an interior of the insertion hole 62 with an exterior of the discharge port 68. The discharge hole 66*a* is directed downward in FIG. 1, i.e., directed downward relative to the gravitational direction. The slot 69 is formed at a tip end of the discharge port 68. The slot 69 is dented from the inner periphery of the discharge port 68 outward in the radial direction to define an inner rail. The discharge port 68 has an opening 69*a* on the lower side to enable insertion of a clip 70 upward in FIG. 1 into the slot 69. The slot 69 further enables to retain the clip 70 radially inward.

A valve (manual valve) 10 is formed of, for example, a resin material integrally in one piece. The valve 10 includes a knob 20, a stem 30, a stopper 36, a male thread 40, and a tip end 50 in this order in a coaxial form. The knob 20 is in a shape easily pinched and twisted with fingers of a user. In the present example, the knob 20 is in a butterfly-shape. The knob 20 may function as a handle. The stem 30 is a bar-shaped member extended from the knob 20 in the axial direction. The bar-shape may encompass various shape such as a circular cross section or a polygonal cross section in a solid object or a hollow object. The stopper 36 is an umbrella-shaped member or a disc-shaped member extended from the stem 30 in the axial direction. The stopper 36 is greater in outer diameter than the stem 30. The male thread 40 is extended from the stopper 36 in the axial direction. The male thread 40 has an outer periphery defining multiple thread lines. The tip end 50 is extended from the male thread 40 in the axial direction. The tip end 50 has a dent extending along the outer periphery of the tip end 50. The tip end 50 is installed with an O-ring 80 around the dent. The O-ring 80 is an annular member formed of an elastic material such as rubber.

Figure 2:
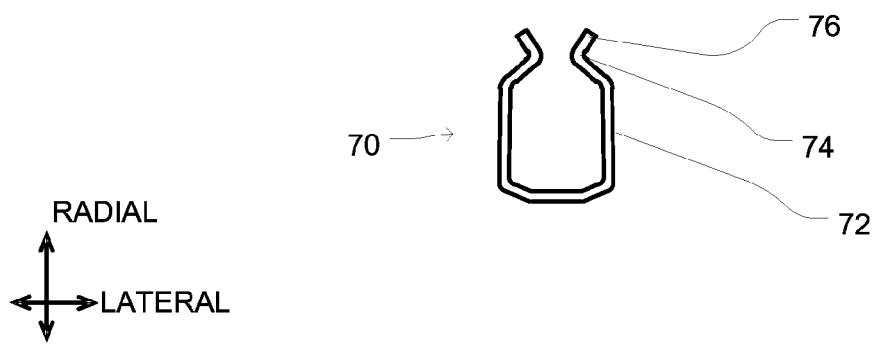
FIG. 2 is a view showing the clip when viewed from the arrow II in FIG. 1.

As shown in FIG. 2, the clip 70 is substantially in a U-shape. The clip 70 may be formed by bending a metallic wire to form a body 72, a neck 74, and ends 76. The inner diameter of the body 72 is greater than the outer diameter of the stem 30 of the valve 10 and is less than the outer diameter of the stopper 36 of the valve 10. The outer shape of the body 72 is in a form to be fitted to the inner shape of the slot 69. The clip 70 is throttled at the neck 74 relative to the body 72 and the ends 76. The inner diameter of the neck 74 is smaller than the outer diameter of the stem 30. The clip 70 enlarges in inner diameter from the neck 74 toward the ends 76. The clip 70 is configured to be fitted resiliently to the outer periphery of the stem 30.

The valve 10 and the tank wall 60 may be components of a discharge device.

Figure 3:
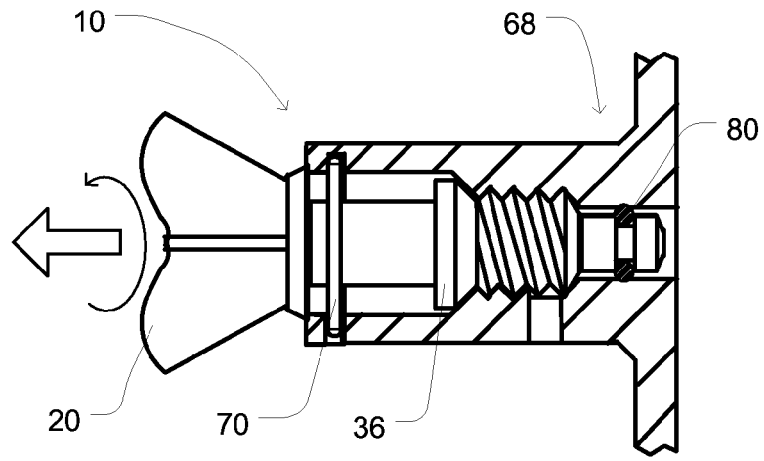
FIG. 3 is a partially sectional view showing the manual valve installed to the tank wall and at a close position according to the first embodiment.

Subsequently, a process to mount the valve 10 to the discharge port 68 will be described. In the first embodiment, the valve 10 is inserted into the discharge port 68 from the outside of the tank. In FIG. 1, the stem 30 of the valve 10 is coaxially aligned relative to the insertion hole 62 of the discharge port 68. In the present state, the tip end 50 and the male thread 40 are inserted into the insertion hole 62. Further, the male thread 40 is screwed into the female thread 67 of the discharge port 68 by twisting the knob 20, thereby to screw the valve 10 into the discharge port 68 rightward in FIG. 1. Finally, the knob 20 makes contact with an end of the discharge port 68. Thus, the valve 10 is screwed sufficiently into the discharge port 68. Subsequently, the clip 70 is inserted into the slot 69. Specifically, as shown in FIGS. 1 and 2, when the clip 70 is inserted into the slot 69 from the lower side in FIG. 1 through the opening 69a, the ends 76 and the neck 74 of the clip 70 resiliently expanded along the outer periphery of the stem 30. The ends 76 of the clip 70 may function to guide the stem 30 into the neck 74. As the clip 70 is further inserted into the slot 69, the clip 70 is snap-fitted to the stem 30 and/or the inner periphery of the slot 69. Thus, the valve 10, the tank wall 60, and the clip 70 are assembled together to be in the state shown in FIG. 3. The clip 70 is retained by the slot 69 to surround the outer periphery of the stem 30. In the state of FIG. 3, the O-ring 80 is elastically fitted to the inner periphery of the discharge port 68 to seal a gap liquid-tightly between the tip end 50 and the discharge port 68.

Subsequently, draining process will be described. In FIG. 3, the knob 20 is twisted to release the valve 10 from the discharge port 68. Specifically, as the valve 10 is twisted, the male thread 40 is unscrewed from the female thread 67 while moving leftward in FIG. 3. When the valve 10 is further twisted, as show in FIG. 4, the O-ring 80 and the tip end 50 are released from the inner periphery of the discharge port 68. Thus, the inner periphery of the discharge port 68 and the tip end 50 form a discharge passage 66 therebetween to interface with the discharge hole 66a. Thus, as shown by the arrows, fluid in the tank is enabled to flow through the discharge passage 66 and the discharge hole 66a to the exterior of the discharge port 68.

Figure 4:
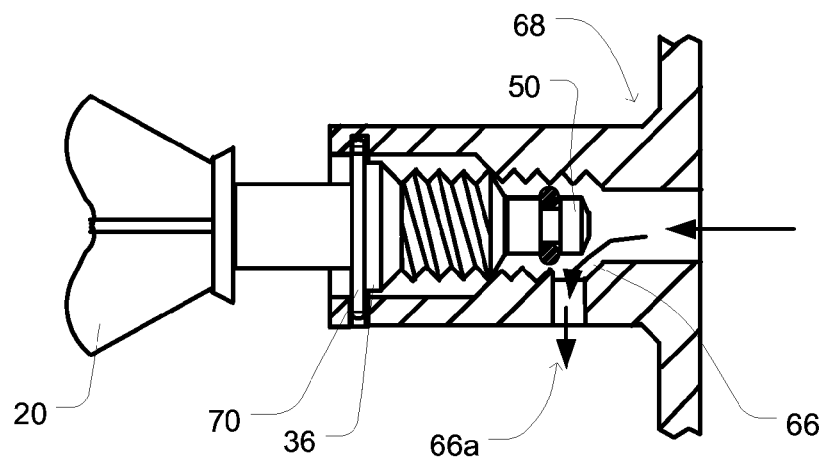
FIG. 4 is a partially sectional view showing the manual valve installed to the tank wall and at an open position according to the first embodiment.
Figure 4:
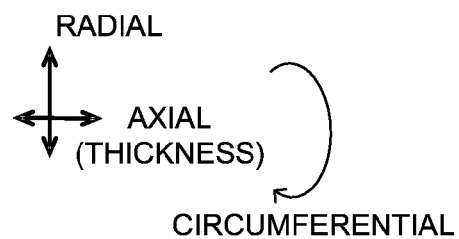

As the knob 20 is twisted, the stopper 36 also moves leftward in FIG. 4 to make contact with the clip 70. That is, the clip 70 regulates the movement of the stopper 36 in the axial direction, thereby to prohibit the valve 10 from moving further leftward. Thus, the clip 70 avoids detachment of the valve 10 from the discharge port 68. In the present state, the male thread 40 may be entirely unscrewed from the female thread 67 or may be partially meshed with the female thread 67.

Second Embodiment

Figure 5:
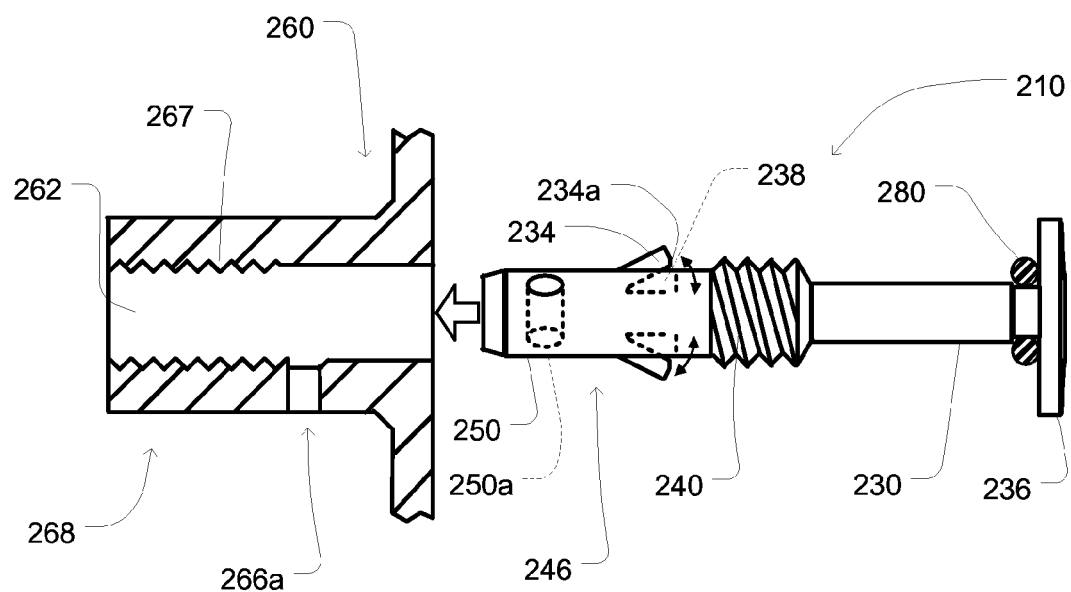
FIG. 5 is an exploded view showing a manual valve and a tank wall of a discharge device according to a second embodiment.
Figure 5:
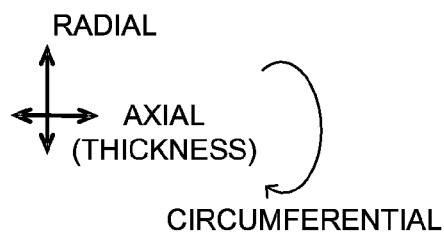

As shown in FIG. 5, a tank wall 260 is a part of a tank formed of, for example, a resin material. The tank wall 260 has a discharge port 268, which is a tubular protrusion integrally formed with the tank wall 260 and projected from the tank wall 260. The discharge port 268 internally defines an insertion hole 262, a discharge hole 266a, and a female thread 267. The insertion hole 262 is a through hole interfacing an interior of the tank with an exterior of the tank. The female thread 267 is formed on the inner periphery of the discharge port 268 to define a part of the insertion hole 262. The discharge hole 266a is a through hole extending in the radial direction through the tubular wall of the discharge port 268 to interface an interior of the insertion hole 262 with an exterior of the discharge port 268.

A valve (manual valve) 210 is formed of, for example, a resin material integrally in one piece. The valve 210 includes a stopper 236, a stem 230, a male thread 240, and a body 246 in this order in a coaxial form. The stopper 236 is an umbrella-shaped member or a disc-shaped member. The stem 230 is a bar-shaped member extended from the stopper 236 in the axial direction. The bar-shape may encompass various shape such as a circular cross section or a polygonal cross section in a solid object or a hollow object. The stem 230 is smaller in outer diameter than the stopper 236. The stem 230 has a dent extending along the outer periphery of the stem 230. The stem 230 is installed with an O-ring 280 around the dent. The O-ring 280 is an annular member formed of an elastic material such as rubber. The male thread 240 is extended from the stem 230 in the axial direction. The male thread 240 has an outer periphery defining multiple thread lines.

The body 246 is a bar-shaped member extended from the male thread 240 in the axial direction. The bar-shape may encompass various shape such as a circular cross section or a polygonal cross section in a solid object or a hollow object. The body 246 has a tip end 250 having a tool hole 250a extending through the tip end 250 in the radial direction. The tool hole 250a may enable insertion of a tool such as a screwdriver therethrough to enable a user to cause torque to rotate the valve 210. The tip end 250 may function as a handle.

The tool hole 250*a* may be omitted. Instead of the tool hole 250*a* or in addition to the tool hole 250*a*, the tip end 250 may have a head in a polygonal shape. Specifically, the tip end 250 may be in, for example, a hexagonal shape, a flat shape, or a rectangular shape, to be fitted with a screw wrench.

The body 246 further has pins 234 and recesses 238. The pin 234 may be formed by machining the body 246 or may be integrally molded with the body 246. The pins 234 are at opposite positions in the radial direction. The recesses 238 are at opposite positions in the radial direction. Each of the pins 234 is projected in the radial direction outward from the circumferential periphery of the body 246. The pin 234 has an end surface 234*a* at a right angle relative to a center axis of the tip end 250 and/or relative to the circumferential periphery of the tip end 250. Each of the recess 238 is dented in the radial direction inward from the circumferential periphery of the body 246. The pin 234 is cantilevered at one end. The pin 234 is resiliently pivoted at the one end and bendable relative to the recess 238. On receiving force inward in the radial direction, the pin 234 is resiliently bent in the radial direction inward and is retracted into the recess 238. On releasing the force, the pin 234 resiliently recovers in form in the radial direction to project from the recess 238 outward.

The valve 210 and the tank wall 260 may be components of a discharge device.

Subsequently, a process to mount the valve 210 to the discharge port 268 will be described. In the second embodiment, the valve 210 is inserted into the discharge port 268 from the inside of the tank.

In FIG. 5, the tip end 250 of the valve 210 is coaxially aligned relative to the insertion hole 262 of the discharge port 268. In the present state, the tip end 250 is inserted into the insertion hole 262 leftward in FIG. 5.

As the valve 210 is further pushed leftward in FIG. 5, the pins 234 are urged from the tank wall surface of the tank wall 260 inward in the radial direction. Thus, the pins 234 are resiliently bent at the one ends and are retracted into the recesses 238, respectively. As the tip end 250 is further pushed into the insertion hole 262 leftward, the pins 234 are entirely retracted into the recess 238, thereby to enable the tip end 250 to move through the insertion hole 262 and the female thread 267.

Figure 7:
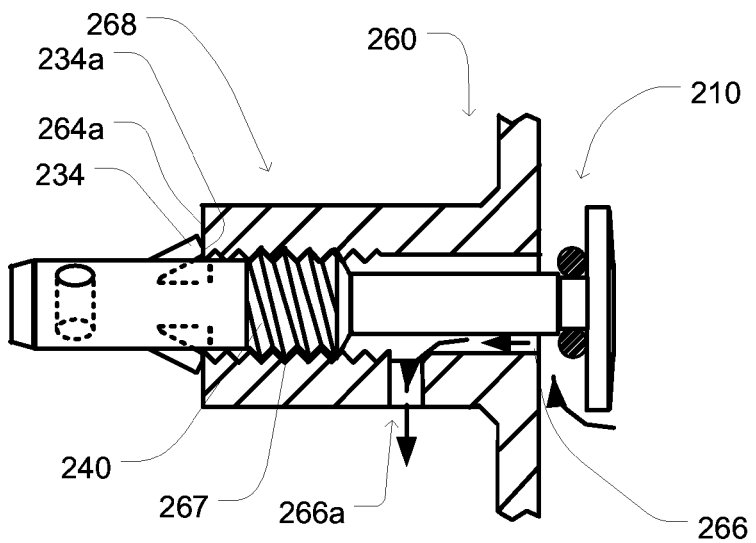
FIG. 7 is a partially sectional view showing the manual valve installed to the tank wall and at an open position according to the second embodiment.

When the tip end 250 is further pushed into the insertion hole 262 to pass through the inside of the female thread 267, the tip end 250 partially pops out of the discharge port 268 leftward, and the male thread 240 makes contact with the female thread 267 of the discharge port 268. In the present state, a bar-shaped tool, such as a screwdriver, is inserted through the tool hole 250*a* to enable a user to rotate the valve 210. Alternatively, a screw wrench may be fitted to the tip end 250 to enable a user to rotate the valve 210. As the tip end 250 is rotated from the outside of the tank, the male thread 240 is screwed into the female thread 267 to enable the valve 210 to move leftward further. As the valve 210 is further screwed through the discharge port 268 to move the tip end 250 leftward, the pins 234 resiliently recover in form to be projected from the recess 238 radially outward (FIG. 7).

Figure 6:
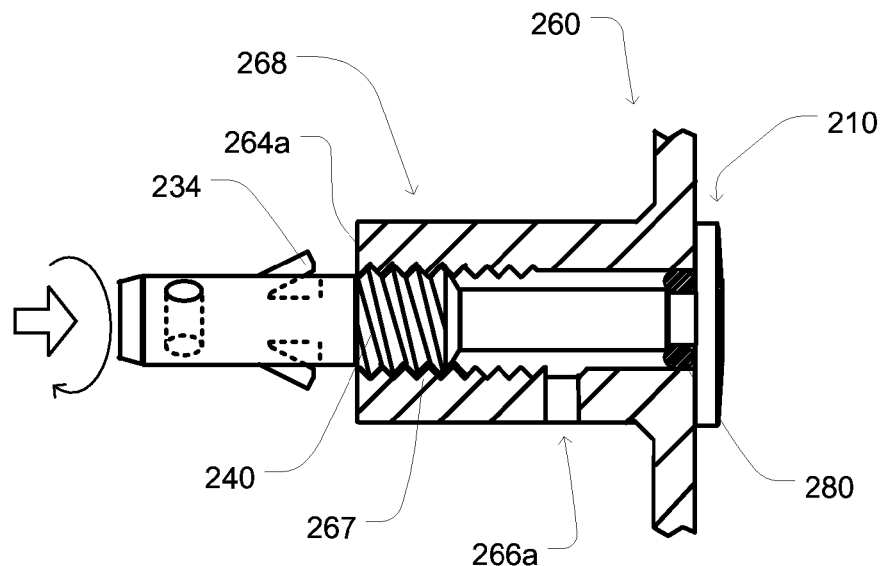
FIG. 6 is a partially sectional view showing the manual valve installed to the tank wall and at a close position according to the second embodiment.

As the valve 210 is further screwed through the discharge port 268 to move leftward, as shown in FIG. 6, the O-ring 280 makes contact with the inner tank wall surface of the tank wall 260. In the present state, the O-ring 280 is elastically interposed between the tank wall 260 and the stopper 236 to seal a gap liquid-tightly between the tank wall 260 and the stopper 236.

Subsequently, draining process will be described. In FIG. 6, the tip end 250 is twisted from the outside of the tank to move the valve 210 from the discharge port 268 rightward in FIG. 6. Specifically, as the valve 210 is twisted, the male thread 240 is screwed relative to the female thread 267 while moving rightward in FIG. 6. When the valve 210 is further twisted, as show in FIG. 7, the O-ring 280 and the stopper 236 are released from the tank wall surface of the tank wall 260. Thus, the inner periphery of the discharge port 268 and the stem 230 form a discharge passage 266 therebetween to interface with the discharge hole 266*a*. Thus, as shown by the arrows, fluid in the tank is enabled to flow through the discharge passage 266 and the discharge hole 266*a* to the exterior of the discharge port 268.

In the present state, the end surfaces 234*a* of the pins 234 may make contact with a pin seat 264*a* of the discharge port 268. Thus, the pins 234 are latched onto the discharge port 268. That is, the pin seat 264*a* of the discharge port 268 regulates the movement of the valve 210 in the axial direction, thereby to prohibit the valve 210 from moving further rightward. Thus, the pins 234 avoid detachment of the valve 210 from the discharge port 268.

Third Embodiment

Figure 8:
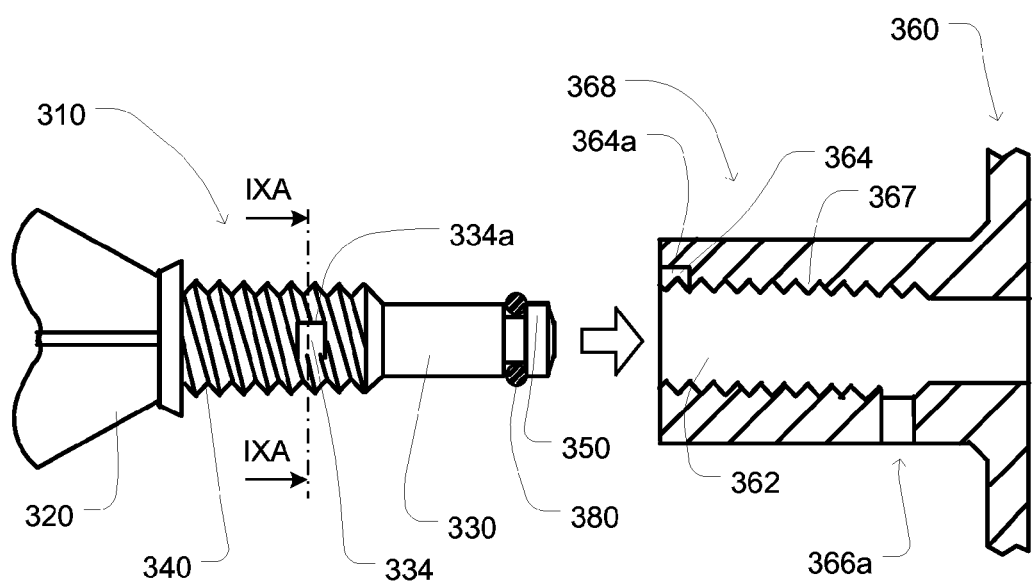
FIG. 8 is an exploded view showing a manual valve and a tank wall of a discharge device according to a third embodiment.
Figure 8:
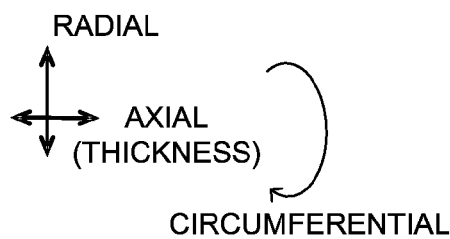

As follows, a third embodiment of the present disclosure will be described with reference to drawings. As shown in FIG. 8, a tank wall 360 is a part of a tank for receiving fluid. The tank wall 360 has a discharge port 368, which is a tubular protrusion integrally formed with the tank wall 360 and projected from the tank wall 360. The discharge port 368 internally defines an insertion hole 362, a discharge hole 366*a*, a female thread 367, and a pin guide 364. The insertion hole 362 is a through hole interfacing an exterior of the tank with an interior of the tank. The female thread 367 is formed on the inner periphery of the discharge port 368 to define a part of the insertion hole 362. The discharge hole 366*a* is a through hole extending in the radial direction through the tubular wall of the discharge port 368 to interface an interior of the insertion hole 362 with an exterior of the discharge port 368.

Figure 9A:
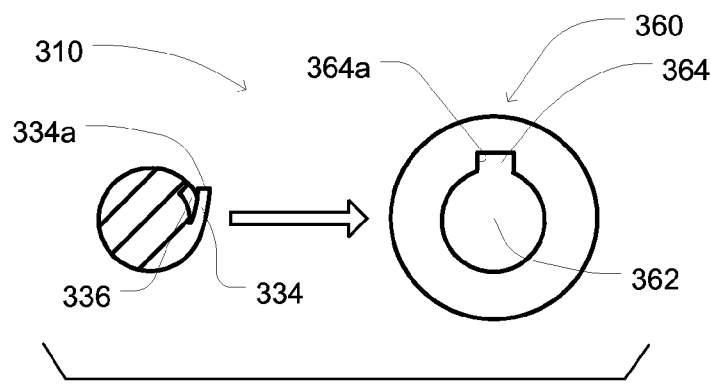
FIGS. 9A to 9C are sectional views showing a process to mount the manual valve into the tank wall according to the third embodiment.

The female thread 367 has a pin guide 364 formed to overlap with the insertion hole 362 in both the axial direction and the radial direction. The pin guide 364 has a length less than the insertion hole 362 in the axial direction. The pin guide 364 extends radially outward to form a key groove (FIG. 9A). The pin guide 364 has a flat surface defining a pin seat 364*a*. The pin seat 364*a* is at a right angle relative to the inner periphery of the insertion hole 362.

A valve (manual valve) 310 is formed of, for example, a resin material integrally in one piece. The valve 310 includes a knob 320, a male thread 340, a stem 330, and a tip end 350 in this order in a coaxial form. The knob 320 is in a shape easily pinched and twisted with fingers of a user. In the present example, the knob 320 is in a butterfly-shape. The knob 320 may function as a handle. The male thread 340 is extended from the knob 320 in the axial direction. The male thread 340 has an outer periphery defining multiple thread lines. The stem 330 is a bar-shaped member extended from the male thread 340 in the axial direction. The bar-shape may encompass various shape such as a circular cross section or a polygonal cross section in a solid object or a hollow object. The tip end 350 is extended from the stem 330 in the axial direction. The tip end 350 has a dent extending along the outer periphery of the tip end 350. The tip end 350 is installed with an O-ring 380 around the dent. The O-ring 380 is an annular member formed of an elastic material such as rubber.

In FIGS. 8 and 9A, the male thread 340 has a pin 334 and recess 336. The pin 334 is raised in the radial direction outward from the outer periphery of the male thread 340. In FIG. 9A, the pin 334 extends substantially along the tangential line of the cross section of the male thread 340. The pin 334 has an end surface 334a in the circumferential direction. The recess 336 is dented in the radial direction inward from the outer periphery of the male thread 340. The pin 334 is cantilevered at one end in the circumferential direction. The pin 334 is resiliently pivoted at the one end and bendable relative to the recess 336. On receiving force inward in the radial direction, the pin 334 is resiliently bent in the radial direction inward and is retracted into the recess 336. On releasing the force, the pin 334 resiliently recovers in form in the radial direction to project from the recess 336 outward.

In the present example, in FIG. 8, the pin 334 has three sides. One side forms a free end defining the end surface 334a. The one side is on the opposite side of the one cantilever end. The pin 334 may be formed by machining the male thread 340. Specifically, three linearly slits may be formed on the male screw to define the three sides. Subsequently, a machining blade may be wedged into the free end to raise up the pin 334 outward in the radially direction from the male thread 340, thereby simultaneously to form the recess 336 underneath. Alternatively, the pin 334 may be integrally molded with the male thread 340. Alternatively, the pin 334 may be a separate component from the valve 310 and may be installed to the recess 336 to be projected beyond the male thread 340.

The valve 310 and the tank wall 360 may be components of a discharge device.

Subsequently, a process to mount the valve 310 to the discharge port 368 will be described. In the third embodiment, the valve 310 is inserted into the discharge port 368 from the outside of the tank.

In FIGS. 8 and 9A, the tip end 350 of the valve 310 is coaxially aligned relative to the insertion hole 362 of the discharge port 368. In the present state, the tip end 350 and the stem 330 are inserted into the insertion hole 362. Further, the male thread 340 is screwed into the female thread 367 of the discharge port 368 by twisting the knob 320, thereby to screw the valve 310 into the discharge port 368 rightward in FIG. 8. Finally, the valve 310 is screwed sufficiently into the discharge port 368, and the O-ring 380 is elastically fitted to the inner periphery of the discharge port 368 to seal a gap liquid-tightly between the tip end 350 and the discharge port 368. In the present state, the knob 320 may make contact with an end of the discharge port 368.

Figure 9B:
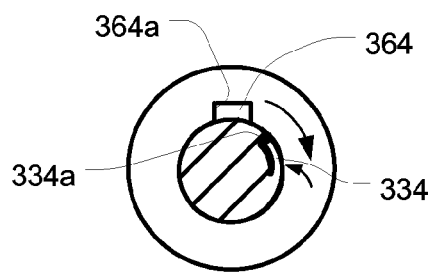

As follows, the function of the pin 334 and the pin guide 364 will be described. In FIGS. 8 and 9A, when the male screw of the valve 310 is screwed into the female thread 367 of the discharge port 368, the pin 334 makes contact with the inner periphery of the insertion hole 362. In the present state, as the male thread 340 is screwed into the female thread 367 rightward in FIG. 8, the cantilever end of the pin 334 is smoothly drawn into the female thread 367. Thus, the pin 334 is applied with force radially inward. Consequently, the pin 334 is resiliently contracted radially inward into the recess 336. As shown in FIG. 9B, the male thread 340 is further screwed into the female thread 367, while the pin 334 is contracted in the recess 336. In this way, the pin 334 does not disturb screwing of the valve 310 into the female thread 367 when the valve 310 is screwed.

Figure 9C:
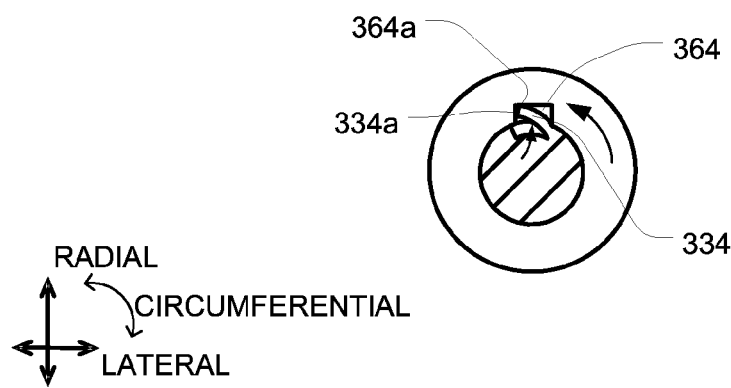

In the third embodiment, draining is conducted similarly to the draining process of the first embodiment by twisting the knob 320 to release the valve 310 from the discharge port 368. In the draining, as the male thread 340 is unscrewed from the female thread 367, the pin 334 also moves leftward in FIG. 8. When the pin 334 is at the same position as the pin guide 364 in the axial direction, the pin 334 resiliently recovers in form to be projected from the recess 336 into the pin guide 364, as shown in FIG. 9C. In the present state, the end surface 334a of the pin 334 is in contact with the pin seat 364a of the pin guide 364. Thus, the pin 334 is latched onto the pin seat 364a of the pin guide 364 in the circumferential direction. That is, the pin seat 364a regulates the movement of the pin 334 in the circumferential direction, thereby to prohibit movement of the valve 310 relative to the discharge port 368 in the axial direction. Thus, the engagement of the pin 334 to the pin seat 364a prohibits movement of the valve 310 leftward in FIG. 8. Thus, the pin 334 avoids detachment of the valve 310 from the discharge port 368.

When the valve 310 is again screwed into the discharge port 368, the pin 334 is again contracted into the recess 336. Therefore, the pin 334 does not prohibit screwing of the valve 310, after the pin 334 latches onto the pin seat 364a. Therefore, the present configuration regulates a movable range of the valve 310 relative to the discharge port 368 in the axial direction.

Other Embodiment

In the second embodiment, the pin and the recess may be one or may be three or more. In the third embodiment, the pin and the recess may be two or more.

In the second and third embodiments, the pins may be shifted from each other around the center axis of the valve in the circumferential direction at a predetermined angle. The recesses may be shifted from each other around the center axis of the valve in the circumferential direction at the predetermined angle.

The discharge device may be used to vent gas to enable to fill fluid in the tank.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A discharge device comprising:
a manual valve; and
a tank wall having a discharge port for discharging fluid, wherein the manual valve includes:
a body;
a male thread extended from the body;
a stem extended from the male thread; and
a stopper extended from the stem, the stem is smaller than the stopper in an outer diameter,
the body has at least one pin and at least one recess,
the at least one pin is projected in a radial direction outward from an outer periphery of the body,
the at least one recess is dented in the radial direction inward from the outer periphery of the body,
the pin is cantilevered at one end and is configured to be resiliently retracted into the recess,
the body has a tip end having a tool hole extending through the tip end in the radial direction,
the discharge port defines an insertion hole and a female thread,
the at least one in is configured to make contact with the tank wall in an axial direction and to regulate movement of the manual valve in the axial direction in a state where the male thread is inserted into the insertion hole and is meshed with the female thread,
the stopper is configured to move away from the tank wall, and the at least one in is configured to make contact with the tank wall to regulate movement of the manual valve in one axial direction, when the male thread is rotated relative to the female thread in one circumferential direction, and
the at least one in is configured to move away from the tank wall, and the stopper is configured to regulate movement of the manual valve in an other axial direction, when the male thread is rotated relative to the female thread in an other circumferential direction.

2. The discharge device according to claim 1, further comprising:
an O-ring equipped on the outer periphery of the stem.

3. The discharge device according to claim 1, wherein
the at least one pin includes a plurality of pins shifted from each other in a circumferential direction at a predetermined angle, and
the at least one recess includes a plurality of recesses shifted from each other in the circumferential direction at the predetermined angle.

\* \* \* \* \*